United States Patent
Chen et al.

(10) Patent No.: US 7,646,433 B2
(45) Date of Patent: Jan. 12, 2010

(54) USER SELECTABLE IMAGE SCALING

(75) Inventors: Jeff Chen, Irvine, CA (US); William Chen, Taoyuan (TW)

(73) Assignees: D-Link Systems, Inc., Fountain Valley, CA (US); Alpha Networks, Inc., Hsinchu (TW)

(*) Notice: Subject to any disclaimer, the term of this patent is extended or adjusted under 35 U.S.C. 154(b) by 657 days.

(21) Appl. No.: 11/142,128

(22) Filed: May 31, 2005

(65) Prior Publication Data

US 2006/0279655 A1 Dec. 14, 2006

(51) Int. Cl.
*H04N 5/50* (2006.01)
*G06F 3/00* (2006.01)

(52) U.S. Cl. ......................... 348/581; 715/800

(58) Field of Classification Search .................. 348/581, 348/561, 222.1, 580, 582, 562, 571
See application file for complete search history.

(56) References Cited

U.S. PATENT DOCUMENTS

| | | | | |
|---|---|---|---|---|
| 4,387,365 A | * | 6/1983 | Berry et al. | 708/442 |
| 5,208,903 A | * | 5/1993 | Curry | 345/594 |
| 5,467,144 A | * | 11/1995 | Saeger et al. | 348/566 |
| 5,861,887 A | * | 1/1999 | Butler et al. | 345/428 |
| 6,456,305 B1 | * | 9/2002 | Qureshi et al. | 715/800 |
| 6,611,273 B2 | * | 8/2003 | Stokes et al. | 345/590 |
| 7,084,905 B1 | * | 8/2006 | Nayar et al. | 348/222.1 |
| 2003/0079224 A1 | * | 4/2003 | Komar et al. | 725/32 |
| 2008/0005272 A1 | * | 1/2008 | Kim et al. | 709/217 |

OTHER PUBLICATIONS

Ritchie, J. and Kuehnel, T., "UPnP AV Architecture: 0:83," design document; Jun. 12, 2002; 22 pages; Contributing Members of the UPnPTM Forum.
Ritchie, John, "MediaRenderer:1 Device Template Version 1.01," Standardized DCP; Jun. 25, 2002; 12 pages; Contributing Members of the UPnPTM Forum.
Ritchie, John, "MediaServer: 1 Device Template Version 1.01," Jun. 25, 2002; 12 pages; Contributing Members of the UPnPTM Forum.
"Overview of UPnP AV Architecture—A Digital Media Distribution Technology for the Home," Version 1.00: Jul. 2, 2003; 10 pages; Intel Corporation; http://developer.intel.com.

* cited by examiner

*Primary Examiner*—Paulos M Natnael
(74) *Attorney, Agent, or Firm*—Berkeley Law & Technology Group, LLP

(57) ABSTRACT

Disclosed are a system and method of processing image data for presentation of an image on a display. In particular, image data may be transformed and/or mapped for presentation on a display based, at least in part, on a user preference.

9 Claims, 4 Drawing Sheets

USER SELECTABLE IMAGE SCALING

BACKGROUND

1. Field

Subject matter disclosed herein relates to the presentation of images on a display.

2. Information

Television sets are typically capable of presenting images to viewers based upon broadcast signals received from local television stations, cable transmissions, satellite transmissions and/or the like. Additionally, television sets have been capable of presenting image to viewers in response to prerecorded signals from sources such as, for example, video cassette recorders (VCRs), digital video disks (DVDs) and digital video recorders (DVRs). In addition, televisions have been used for presenting images from other sources such as, for example, still images from digital cameras (including cameras on cell phones), and content streamed from the Internet and/or video cameras.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
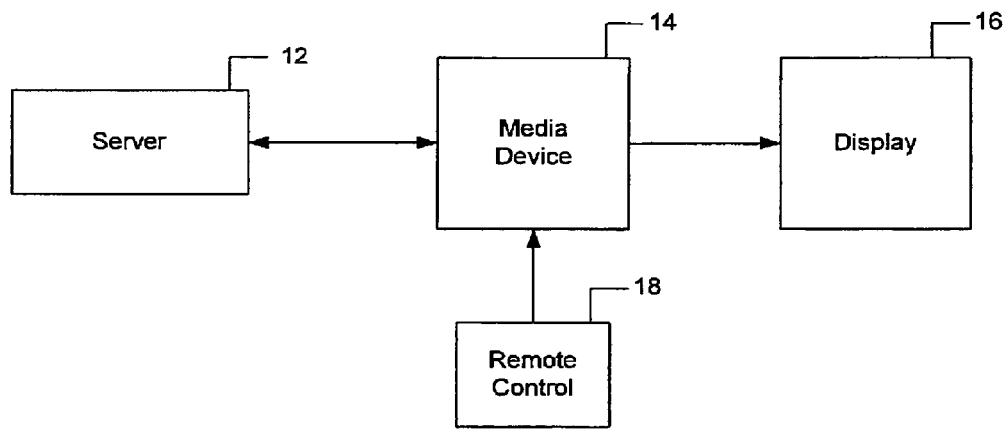
FIG. 1 is a schematic diagram of a system to present images on a display based, at least in part, image data according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Some portions of the detailed description which follow may be presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "transforming," "mapping," "scaling," "obtaining," "selecting," "converting," "factoring," "enumerating," "representing," "storing," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Further, unless specifically stated otherwise, processes described herein, with reference to flow diagrams or otherwise, may also be executed and/or controlled, in whole or in part, by such a computing platform. "Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect. "Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects. "Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a storage medium in combination with processing circuitry to execute such machine-readable instructions. However, these are merely examples of structures which may provide logic and claimed subject matter is not limited in this respect.

A "presentation" as referred to herein relates to an expression of information in a perceivable medium. In one example, although claimed subject matter is not limited in these respects, a presentation may comprise an environmental stimulus such as, for example, generation of images and/or sounds. Such a presentation may also be directed to a particular audience that is capable of sensing the presentation. As described herein, devices may be capable of "presenting" such expressions based, at least in part, on signals that represent such expressions. However, these are merely examples of presentations and claimed subject matter is not limited in these respects.

A "display" as referred to herein relates to a device that is capable of presenting an image in response to one or more signals. For example, although claimed subject matter is not limited in this respect, a display may comprise an array of pixels in predetermined locations to represent portions of images at these predetermined locations. In one particular embodiment, individual pixel elements may be controlled to illuminate a portion of an image at a particular image location based, at least in part, on one or more signals representing the image. However, these are merely example embodiments of a display and claimed subject matter is not limited in these respects.

A "media device" as referred to herein relates to a device that is capable of generating environmental stimuli such as, for example, sounds and/or images in response to encoded information. For example, a media device may be capable of reproducing video images, music and/or other audio signals based, at least in part, on data which is encoded according to a predetermined encoding format. In one embodiment, a media device may comprise an output device such as, for example, a display and/or speaker for generating environmental stimuli. Alternatively, a media device may not necessarily be comprise such an output device but instead may be capable of being coupled to such an output device to provide one or more signals to the output device for generating environmental stimuli. However, these are merely examples of a media device and claimed subject matter is not limited in these respects.

According to an embodiment, a display may be associated with one or more "image display dimensions" defining dimensions of an image that may be presented on the display. In a particular embodiment in which a display comprises a substantially rectangular display, although claimed subject matter is not limited in this respect, such image display dimensions may comprise a "display width" and/or "display height." Here, such a display width and display height may define orthogonal dimensions in a planar display. However, these are merely examples of image display dimensions and claimed subject matter is not limited in these respects. Also, a particular image display dimension may be quantified as a number of pixels that a display extends in the particular image display dimension. However, this is merely an example of how an image display dimension may be quantified according to a particular embodiment and an image display dimension may quantified using other metrics such as, for example, linear measurements.

"Image data" as referred to herein relates to a signal and/or data that is representative of a visual image according to a predefined format. In one particular embodiment, although claimed subject matter is not limited in this respect, image data may represent pixel values at associated locations in an image. In other embodiments, image data may represent a still image or a moving image (e.g., as successive video frames). Image data may also exist in a predefined compressed and/or encoded format. However, these are merely examples of image data and claimed subject matter is not limited in these respects.

According to an embodiment, an image, represented as image data or otherwise, may comprise one or more "image dimensions" which set forth quantities relating to a size of an image. In one particular embodiment of a planar and/or rectangular image, although claimed subject matter is not limited in these respects, an "image width" and "image height" may define orthogonal linear dimensions. Like the aforementioned display width and display height dimensions, an image width and/or image height may be quantified by a number of pixels and/or linear measurements. Again, however, these are merely examples of how linear image dimensions may be quantified and claimed subject matter is not limited in these respects.

A "viewable image" as referred to herein relates to a portion of an image that is capable of being viewed on a display. For example, an image may comprise dimensions that are within display dimensions of a display. In one particular embodiment, although claimed subject matter is not limited in this respect, an image width of an image may be less than or equal to a corresponding image display width of display, and an image height of the image may be less than or equal to a corresponding image display height of display. Accordingly, a viewable image presented on the display may comprise the entire image. In an alternative example, one or more image dimensions of an image may exceed a corresponding image display dimension such that only a viewable portion of the image may be capable of being presented on the display while a non-viewable portion exceeding the corresponding image display dimension is not viewable. Here, the viewable portion may comprise a viewable image.

A "user preference" as referred to herein relates to a user supplied input expressing a desire for a particular action and/or condition. In one particular embodiment, although claimed subject matter is not limited in these respects, a user preference may indicate a choice for a particular mode of operation of a system and/or device from among a plurality of possible choices for such a mode of operation. However, this is merely an example of an expression of a user preference for the operation of a system and/or device and claimed subject matter is not limited in this respect.

According to an embodiment, data may be "mapped" and/or "transformed" from a first format to a second format. Such a mapping and/or transformation may comprise a lossy mapping and/or transformation in that some of the information expressed in the first format is lost in the resulting second format. Alternatively, such a mapping and/or transformation may comprise a non-lossy mapping and/or transformation in which the second format does not lose information from the first format. However, these are merely examples of how data in a first format may be transformed and/or mapped to data in a second format, and claimed subject matter is not limited in these respects.

A "wireless link" as referred to herein relates to a system to transmit information from a source node to a destination node without the use of cabling connecting the source node to the destination node. In one particular embodiment, for example, data may be transmitted in a wireless link in data packets and/or data frames according to a wireless communication protocol. In other embodiments, a wireless link may transmit information in radio frequency (RF) or infrared (IR) signals. However, these are merely examples of a wireless link and claimed subject matter is not limited in these respects.

A "content signal" or "content data" as referred to herein relates to a signal and/or data comprising information that is representative of environmental stimuli such as sounds and/or visual images. Here, the terms "content signal" and "content data" shall be used interchangeably throughout. In one particular embodiment, for example, a content signal may comprise signals which are encoded according to a predetermined format. Here, for example, a content signal may comprise encoded signals that are representative of audio, video, text and/or still images. However, these are merely examples of a content signal and claimed subject matter is not limited in these respects.

According to an embodiment, a media device may be capable of providing a presentation in response to and/or based on, at least in part, a content signal. In a particular embodiment, for example, a media device may be capable of, by itself or in combination with one or more output devices, displaying images and/or generating sounds which are based, at least in part, on one or more content signals.

According to an embodiment, a content signal may comprise information that is temporally defined with reference to a presentation to an audience. In a particular embodiment, for example, a content signal comprising a video component may comprise sequential frames which are temporally referenced to portions of a video presentation. In another particular embodiment, a content signal comprising an audio component may comprise sequential segments that are temporally referenced to portions of an audio presentation. However, these are merely examples of how a content signal may comprise segments which are temporally referenced to portions of a presentation and claimed subject matter is not limited in these respects.

A "communication adapter" as referred to herein relates to one or more devices capable of transmitting and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

A "server" as referred to herein relates to one or more devices and/or one or more processes on a network that manage and/or control network resources. For example, a file server may comprise a computer and storage device for storing files. Accordingly, client users may store files on and/or retrieve files from the file server by accessing the network. Similarly, a server may store content data on one or more storage devices. Here, a client user may obtain the stored content data by accessing a network that communicates with the server. In other embodiments, a server may comprise software in the form of machine-readable instructions enabling the storage of files and/or content for access as illustrated above. However, these are merely examples of a server and claimed subject matter is not limited in these respects.

According to an embodiment, a content signal may be transmitted from a source to a destination by "streaming" the content signal whereby a first temporally referenced portion of the content signal is presented at a media device while a subsequent temporally referenced portion is being contemporaneously transmitted and/or delivered to the media device for subsequent presentation. In a particular embodiment, for example, a media device may display images, by itself or in combination with one or more output devices, of a leading portion of a streamed video signal while a trailing portion of the video signal is being transmitted and/or delivered to the media device. Similarly, a media device may generate sounds based, at least in part, on a leading portion of a streamed audio signal while a trailing portion of the audio signal is being transmitted and/or delivered to the media device. However, these are merely examples of how a content signal may be streamed to a media device and claimed subject matter is not limited in these respects.

According to an embodiment, image data may express an image in predetermined image dimensions. While a display may present a viewable image based, at least in part, on such image data, the display may comprise image display dimensions that differ from the predetermined image dimensions of the image expressed in the image data. Accordingly, in one particular example, the predetermined image dimensions of the image expressed in the image data may be transformed and/or mapped to image dimensions of a viewable image that may be presented on the display. In one particular embodiment, although claimed subject matter is not limited in this respect, such a mapping and/or transformation may comprise scaling one or more of the predetermined image dimensions of the image data in a viewable image. Briefly, an embodiment relates to a method, system and/or apparatus to transform and/or map one or more image dimensions onto one or more predefined image display dimensions based, at least in part, on a predetermined user preference. However, this is merely an example embodiment and claimed subject matter is not limited in this respect.

FIG. 1 is a schematic diagram of a system 10 to present images on a display 16 based, at least in part, image data according to an embodiment. A server 12 may transmit image data to a media device 14 in a data link according to a communication protocol and while media device 14 formats the received image data for presentation of a viewable image on display 16. In the presently illustrated embodiment, although claimed subject matter is not limited in this respect, media device 14 may receive user inputs from as user interface comprising remote control 18 to, for example, select media for presentation on display. In alternative embodiments, however, media device 14 may receive user inputs from a user interface comprising a console (not shown) which is part of media device 14.

According to an embodiment, media device 14 may receive a user preference indicating how the viewable image is to be scaled on display 16 for viewing. In an alternative embodiment, although claimed subject matter is not limited in this respect, media device 14 may receive such a user input from controls on a console (not shown) of media device 14. As illustrated below, a user may select from among a plurality of options to scale the viewable image onto the display such as, for example, scaling image dimensions to be substantially the same as the display dimensions, proportionally scaling image dimensions such that at least one of the image dimensions of a resulting viewable image is substantially the same as a corresponding image display dimensions, and no scaling of the image dimensions. It should be understood, however, that these are merely examples of how a user may express a preference for mapping and/or transforming one or more image dimensions to one or more image display dimensions in a viewable image, and that claimed subject matter is not limited in these respects.

According to an embodiment, media device 14 may comprise any one of several devices capable of generating environmental stimuli, either by itself or in combination with an output device. For example, media device 14 may comprise a computing platform that is capable of processing image. In particular embodiments, although claimed subject matter is not limited in these respects, media device 14 may comprise a home entertainment appliance, a personal computer, a handheld device and/or the like. However, these are merely examples of platforms that may comprise a media device and claimed subject matter is not limited in these respects.

Server 12 may comprise any one of several devices, software controlled processes and/or systems that are capable of transmitting image data over a data link. Server 12 may comprise a communication adapter (not shown) that is capable of transmitting packetized image data to media device 14 over a wired or wireless data transmission medium according to a data transmission protocol such as, for example, versions of IEEE Std. 802.3 or IEEE Std. 802.11, universal serial bus (USB), Firewire, Bluetooth and/or the like. However, these are merely examples of data transmission protocols that may be used to transmit image data over a data link and claimed subject matter is not limited in these respects.

In particular embodiments, although claimed subject matter is not limited in these respects, server 12 may comprise a personal computer, network attached storage device, a camera and/or any other platform capable of obtaining image data. Here, for example, server 12 may retrieve image data in a first format from a memory device such as, for example, one or more mass storage devices capable of storing digitized image information. In other embodiments, in the case where server 12 comprises a camera for example, server 12 may comprise an imaging device (e.g., a CMOS and/or CCD imaging sensor) to generate image data in a first format. In particular embodiments, although claimed subject matter is not limited in these respects, server 12 may transcode image data from the first format to a second format such as, for example, versions of GIF, TIFF, JPEG, JPEG2000, BMP, PNG, MPEG1/2/4, WMV, H.263, H.264, VC-1, DivX, Xvid, Real Video, Nero Digital, QuickTime and/or the like. The image data transcoded to the second format may then be transmitted to media device 14. In alternative embodiments, server 12 may transmit image data to media device 14 in a first format while media device 14 transcodes received image data to a second. Again, these are merely examples of how image data may be transcoded according to particular embodiments and claimed subject matter is not limited in these respects.

According to an embodiment, display 16 may comprise any one of several devices capable of presenting a viewable image based, at least in part, on image data received at media device 14 such as, for example, a cathode ray tube (CRT), plasma display, a liquid crystal display (LCD) or a projection display. However, these are merely examples of devices that are capable of presenting a viewable image based, at least in part, on image data and claimed subject matter is not limited in these respects. In particular embodiments, although claimed subject matter is not limited in these respects, display 16 may be capable of presenting a viewable image in response to any one of several television signal formats such as, for example, Standard Definition (SD) format (e.g., including NTSC and/or PAL formats) and/or High Definition Television (HDTV) formats. In other embodiments, display 16 may be capable of presenting a viewable image in response to other types of formats such as, for example, VGA and SVGA formats. However, it should be understood that these are merely examples of signal formats that may be used for presenting a viewable image on a display and claimed subject matter is not limited in these respects.

Based, at least in part, on image data received from server 12, media device 14 may provide signals display 16 for presenting a viewable image. Here, media device 14 may be capable of generating signals in a particular format (e.g., in one of the aforementioned television signal formats) to display 16 to enable display 16 to present a viewable image based, at least in part, on image data received from server 12. In one particular embodiment, although claimed subject matter is not limited in this respect, server 12 may transmit image data to media device 14 which has been transcoded to a particular format capable of being decoded at media device 14 for presentation on display 16. In alternative embodiments, however, media device 14 may transcode image data received from server 12 to the particular format. However, these are merely examples of how transcoding of image data may be performed according to particular embodiments and claimed subject matter is not limited in these respects.

According to an embodiment, system 10 may be capable of integrating server 12, media device 14 and/or remote control 18 as elements of a Universal Plug and Play Audio Visual (UPnP AV) architecture as illustrated in UPnP AV Architecture: 0.83 for UPnP Version 1.0, UPnP Forum, Jun. 12, 2002. Here, for example, server 12 may comprise a substantially UPnP AV compliant MediaServer comprising one or more devices and/or software controlled processes to provide image data such as, for example, personal computers, VCRs, DVD players, mass storage devices, broadband receivers (e.g., for receiving satellite, cable and/or DSL transmissions), set-top boxes, DVRs and/or the like. However, these are merely examples of devices that may provide a server with image data for transmission to a media device and claimed subject matter is not limited in this respect. Media device 14 may comprise a substantially UPnP AV compliant MediaRenderer according to the aforementioned UPnP AV architecture.

Also, remote control 18 and/or media device 14 may comprise a UPnP Control Point that is capable of controlling one or more aspects of a presentation of a viewable image on display 16 via media device 14. Such controllable aspects of a presentation of a viewable image on display 16 may include, for example, brightness, contrast, stop, pause, seek and/or the like. However, these are merely examples of how a UPnP control point may affect a presentation of a viewable image on a display and claimed subject matter is not limited in these respects. Alternatively, a control panel (not shown) on the media device 14 itself may enable a user to affect presentation of a viewable image on display 16 as illustrated above.

Comprising a UPnP MediaServer, MediaRenderer and Control Point, respectively, server 12, media device 14 and remote control 18 may interact with one another through a UPnP discovery procedure known to those of ordinary skill in the art of UPnP systems. Following such a discovery procedure, server 12 may transmit image data to media device 14 in messages according to a communication protocol such as, for example, a Hypertext Transfer Protocol (HTTP). In one particular embodiment, although claimed subject matter is not limited in this respect, server 12 may stream image data to media device 14 for real-time presentation of a viewable image on display 16.

According to an embodiment, media device 14 may "format" an image for presentation as a viewable image on display 16. Such formatting may include, for example, fitting a viewable image onto display 16 (e.g., by scaling and/or cropping an image represented by image data), inserting boarders, superimposing symbols and/or text information and/or the like. However, these are merely examples of how an image may be formatted for presentation as a viewable image on a display and claimed subject matter is not limited in these respects. In particular embodiments, although claimed subject matter is not limited in these respects, media device 14 may scale one or more dimensions of an image for presentation as a viewable image on display 16.

Figure 2:
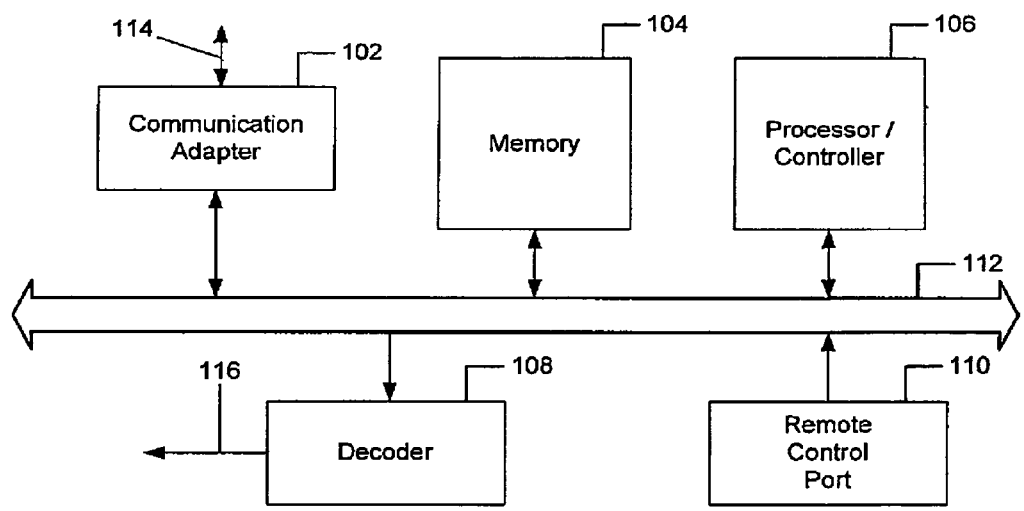
FIG. 2 is a schematic diagram of a media device according to an embodiment.

FIG. 2 is a schematic diagram of a media device 100 according to a particular embodiment of media device 14. Bus 112 may be connected to device to enable inter-device communication. In addition to comprising bus signaling lines according to a particular embodiment, bus 112 may also comprise one or more devices providing core logic enabling devices to communicate with one another over particular device interfaces connecting the devices to bus 112. However, this is merely an example of how devices may be integrated within a media device and claimed subject matter is not limited in this respect.

A communication adapter 102 may receive image data from server 12 in data packets and/or data frames according to any of the aforementioned communication protocols. Communication adapter 102 may comprise, for example, a physical layer transceiver and/or a media access controller capable of receiving data packets and/or data frames transmitted according to a data link protocol such as, for example, versions of IEEE Std. 802.11, IEEE Std. 802.16, IEEE Std. 802.3, USB, Firewire, Bluetooth, cellular telephony protocols and/or the like. However, these are merely examples of how a communication adapter may receive data packets in a data link and claimed subject matter is not limited in these respects. Memory 104 may comprise one or more devices capable of providing a volatile and/or non-volatile memory such as, for example, random access memory (RAM), flash memory, hard drive, optical storage devices and/or the like. In one embodiment, although claimed subject matter is not limited in these respects, communication adapter 102 may store information from received data packets in predetermined buffer locations of memory 104 using direct memory access transactions via bus 112. However, this is merely an example of how a communication adapter may store information received in data packets and claimed subject matter is not limited in these respects.

According to an embodiment a processor/controller 106 may comprise processing circuitry for executing machine-readable instructions stored in memory 104 to perform tasks such as, for example, embedded applications processing, HTTP and/or UPnP protocol processing, and/or processing of user inputs. In particular embodiments, although claimed subject matter is not limited in this respect, processor/controller 106 may comprise processing circuitry formed according to any one of several commercially available processing cores such as, for example, ARM or MIPS processing cores. While in some embodiments image data received at communication adapter 102 may already be transcoded, in other embodiments processor/controller 106 may transcode image data it is received at communication adapter 102. Decoder 108 may receive image data that is transcoded to an image data format such as, for example, versions of GIF, TIFF, JPEG, JPEG2000, BMP, PNG, MPEG1/2/4, WMV, H.263, H.264, VC-1, DivX, Xvid, Real Video, Nero Digital and QuickTime and/or the like. Decoder 108 may then generate an output signal 116 to affect a presentation of a viewable image on display 16 based, at least in part, on the transcoded image data. In particular embodiments, output signal 116 may comprise a television signal such as the aforementioned SD (including, NTSC and PAL) and HDTV signals. However, these are merely examples of types of signals that may be used to produce a viewable image on a display according to particular image display formats and claimed subject matter is not limited in these respects.

A remote control port 110 may receive user inputs from remote control 18 through any suitable wired or wireless transmission medium (e.g., using radio frequency or infrared signaling). In particular embodiments, for example, remote control port 110 may receive inputs from remote control 18 according to any one of several data transmission protocols such as, for example, versions of USB, Firewire, IEEE Std. 802.11, Bluetooth and/or the like. However, these are merely examples of protocols that may be used for transmitting data from a remote control to a media device and claimed subject matter is not limited in these respects.

According to an embodiment, processor/controller 106 may affect output signal 116 of decoder 108 to thereby affect a viewable image which is presented on display 16 in response to output signal 116. In on particular embodiment, although claimed subject matter is not limited in this respect, processor/controller 106 and decoder 108 may comprise distinct semiconductor devices which are integrated on a system board. Alternatively, processor/controller 106 and decoder 108 may be formed in a single semiconductor device as elements of a system on a chip. Here, for example, processor/controller 106 may affect output signal 116 in response to user inputs received at remote control port 110. In one particular embodiment, although claimed subject matter is not limited in this respect, processor/controller 106 may affect scaling an image represented by image data to provide a viewable image for presentation on display 16. For example, processor/controller 106 may affect image dimensions of a viewable image presented on display 16 based, at least in part, on a predetermined user preference.

According to an embodiment, display 16 may present a viewable image in image display dimensions comprising an image display width and an image display height. In a particular embodiment in which display 16 presents a viewable image in an SD format, for example, display 16 may present a viewable image in a 720 pixel image display width by 480 pixel display height. In another embodiment in which display 16 presents a viewable image in an HDTV format, display 16 may present a viewable image in a 1280 pixel image display width by 1080 pixel display height. However, these are merely examples of image display dimensions according to particular display formats and claimed subject matter is not limited in these respects.

Image data received at media device 14 (e.g., digital photographs) may not necessarily be scaled to particular image display dimensions of display 16. In an example embodiment, a user may select a preference for scaling image dimensions from among discrete scaling options. In a first option, a user may select to maintain or not to change scaling of the image data for presentation on display 16. In a second option, a user may select to scale image dimensions of the image data to coincide with the image display dimensions of display 16, and permit distortion in the viewable image. In a third option, a user may select to proportionally scale image width and image height dimensions such that at least one of the image width and/or image height dimensions substantially equals a corresponding image display dimension. However, these are merely examples of how a user may select a preference for scaling image dimensions of an image represented by image data for presentation of a viewable image and claimed subject matter is not limited in these respects.

FIGS. 3A through 3C, and 4A and 4B illustrate effects of selecting the aforementioned first and third options according to particular embodiments of scaling an image for presentation as a viewable image based, at least in part, on a user preference. A display 200 may comprise an image display width w and an image display height h. In one particular embodiment, although claimed subject matter is not limited in this respect, w and h may be quantified in terms of pixels. In other embodiments, w and h may be quantified in terms of linear length. However, these are merely metrics that may be used for quantifying image display dimensions and claimed subject matter is not limited in this respect.

Figure 3A:
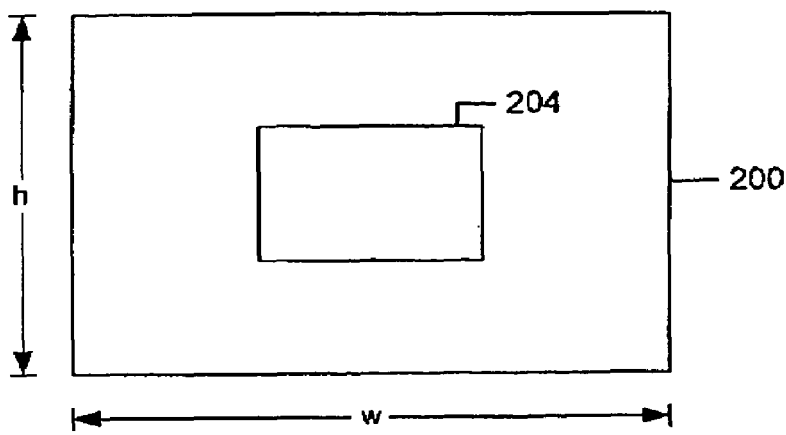
FIGS. 3A through 3C are schematic diagrams illustrating how an image may be presented on a display based, at least in part, on a user preference according to an embodiment.
Figure 3B:
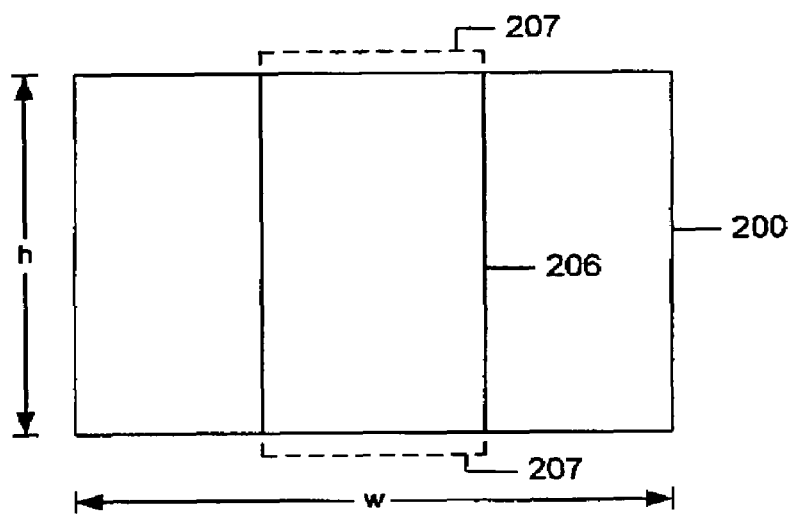
Figure 3C:
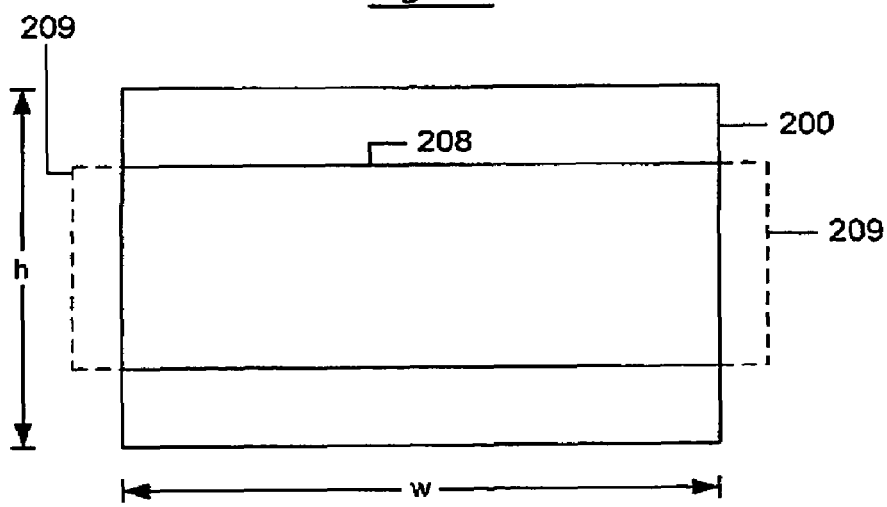

FIGS. 3A through 3C are schematic diagrams illustrating how an image may be presented on a display based, at least in part, on a user preference to maintain or not change scaling of image data according to an embodiment of the aforementioned first option. Image dimensions of viewable images 204, 206 and 208 may be quantified by pixels. Image data from media device 14, for example, may define pixel locations that are mapped to corresponding pixel locations in display 200. In one particular embodiment, pixels defined in image data may be mapped and/or transformed to corresponding pixels in display 200 on a pixel-to-pixel basis. Here, for each pixel defined in image data from media device 14 there may be exactly one corresponding pixel in a corresponding viewable image presented on display 16. Accordingly, resulting viewable image presented on display 200 may comprise dimensions that are substantially scaled to dimensions of the image represented by image data. However, this is merely an example of how a viewable image may be formatted for a display in response to a preference for maintaining or not changing scaling of image data and claimed subject matter is not limited in this respect.

In FIG. 3A, display 200 presents viewable image 204 based, at least in part, on image data received by media device 14 representing an image comprising an image width dimension less than w and an image height dimension that is less than h. Accordingly, an image represented by image data received by media device 14 (e.g., pixels of an image represented by the received image data) may be entirely mapped and/or transformed to viewable image 204 within image display dimensions of display 200. In FIG. 3B, display 200 presents viewable image 206 based, at least in part, on image data received by media device 14 representing an image comprising an image width dimension less than w and an image height dimension that exceeds h. As such, viewable image 206 does not include a cropped portion 207 of the image represented by the image data received by media device 14 which exceeds h. In FIG. 3C, display 200 presents viewable image 208 based, at least in part, on image data received by media device 14 representing an image comprising an image width dimension that exceeds w and an image height dimension that is less than h. As such, viewable image 208 does not include a cropped portion 209 of the image represented by the image data received by media device 14 which exceeds w. Here, it should be understood that the embodiments illustrated with reference to FIGS. 3A through 3C are merely example embodiments of how image data may be presented on a display based, at least in part, on a user preference to maintain or not change scaling of image data and that claimed subject matter is not limited in these respects.

In a particular embodiment of the aforementioned second option of scaling a viewable image for presentation on a display based, at least in part, on a user preference, the viewable image may be scaled for presentation on display 200. Here, an image (not shown) represented by image data received at media device 14 may comprise an image width dimension that is different from w and/or an image height dimension that is different from h. In response to a user preference to scale image dimensions of an image represented by received image data to coincide with the image display dimensions of display 200, media device 14 may transform and/or map the received image data to the image display dimensions of display 200. Such a transformation and/or mapping may comprise, for example a mapping of pixels represented by the image data to pixels in display 200 such that a resulting transformed image comprises an image width to substantially match w and an image height to substantially match 16. Here, such a transformation and/or mapping of image width and height dimensions need not scale these dimensions proportionally. Accordingly, the transformed image may introduce some image distortion resulting in an elongation in one of these orthogonal dimensions with respect to the other orthogonal dimension. It should be understood, however, that this is merely an example of a response to a user preference to scale image dimensions of the image data to coincide with the image display dimensions of display according to a particular embodiment and that claimed subject matter is not limited in this respect.

Figure 4A:
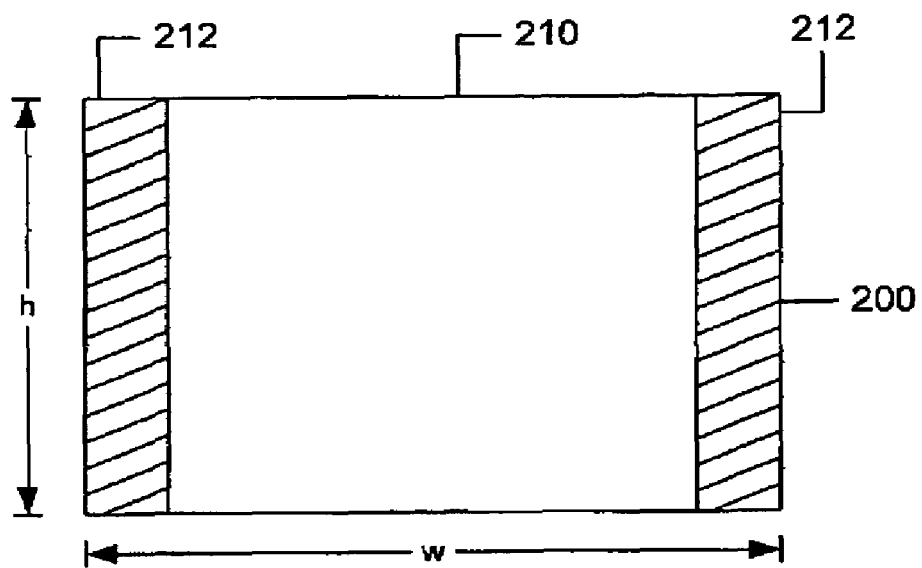
FIGS. 4A and 4B are schematic diagrams illustrating how an image may be presented on a display based, at least in part, on a user preference according to an embodiment.
Figure 4B:
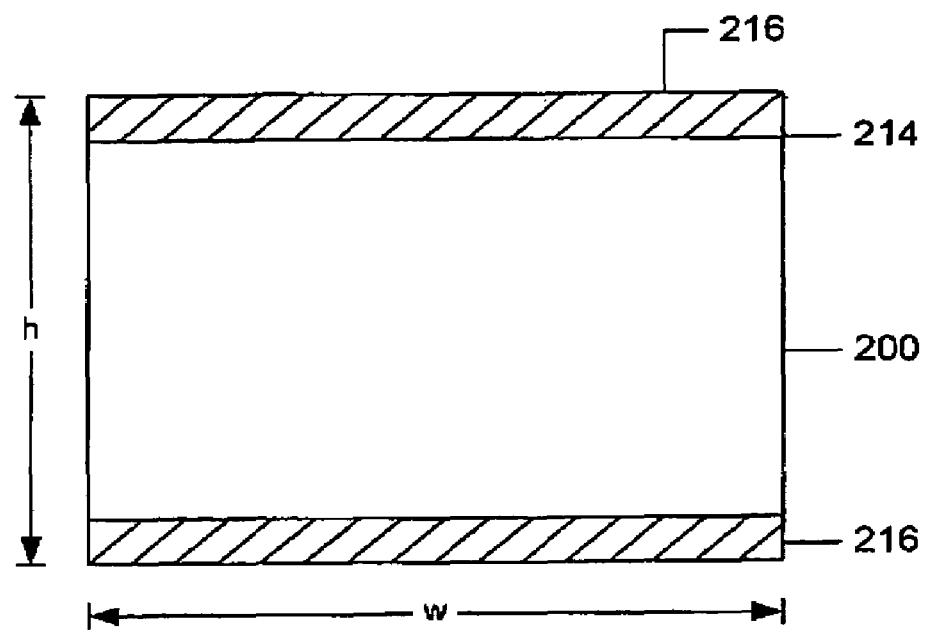

FIGS. 4A and 4B are schematic diagrams illustrating a presentation of images on display 200 in response to a user preference to proportionally scale image dimensions such that at least one of the image dimensions of a viewable image substantially equals a corresponding image display dimension. Here, height and width image dimensions of images represented by image data received by media device 14 are not proportional to image display dimensions w and h of display 200. In the particularly illustrated embodiment, although claimed subject matter is not limited in this respect, pixels defined in image data may be mapped and/or transformed to corresponding pixels in display 200 such that image dimensions of the image data are "proportionally scaled" to image dimensions of the viewable image presented on display 200. At least one of the image dimensions of the resulting viewable image may also substantially equal a corresponding one of the image display dimensions w or h, while the other image dimension does not exceed the other orthogonal display dimension. However, this is merely an example of proportionally scaling image dimensions such that at least one of the image dimensions substantially equals a corresponding image display dimension and claimed subject matter is not limited in these respects.

In FIGS. 4A and 4B, display 200 presents viewable image 210 based, at least in part, on image data received at media device 14 representing images having width and height dimensions that are not proportional to image display dimensions w and h. In particular, the ratio of w to h is not equal to the ratio of the width to height dimensions of the image. In FIG. 4A, for example, the ratio of w to h exceeds a ratio of the width to length dimensions of an image mapped and/or transformed to viewable image 210. Here, width and height dimensions of the image represented by image data received by media device 14 are proportionally scaled such that the height dimension of viewable image 210 substantially matches h. Remaining portions 212 of display 200 may then be blacked out. In FIG. 4B, in another example, a ratio of the width to length dimensions of an image mapped and/or transformed to viewable image 214 exceeds the ratio of w to h. Accordingly, width and height dimensions of the image represented by image data received by media device 14 are proportionally scaled such that the width dimension of viewable image 214 substantially matches w. Remaining portions 216 may then be blacked out. It should be understood, however, that these are merely examples of how dimensions of an image may be proportionally scaled in response to a user preference and claimed subject matter is not limited in these respects.

Figure 5:
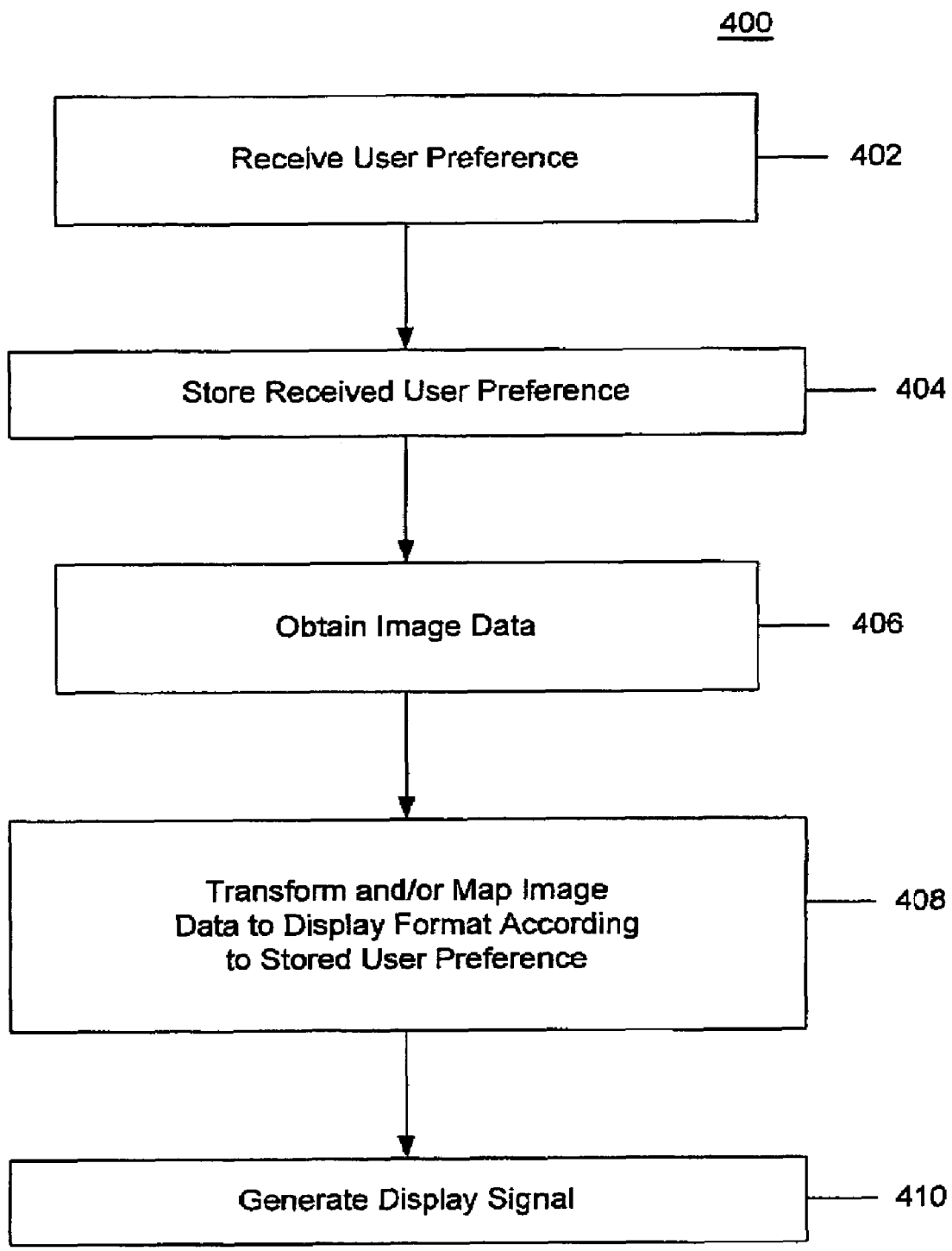
FIG. 5 is a flow diagram illustrating a process embodiment to transform and/or map image data to a viewable image for presentation on a display according to an embodiment.

FIG. 5 is a flow diagram illustrating a process embodiment 400 to scale an image for presentation as a viewable image on a display according to an embodiment of media device 100 (FIG. 2). Process embodiment 400 may be executed, in whole or in part, by a processing circuitry under the control of machine-readable instructions stored in a storage medium. However, this is merely an example of logic that may implement a process for scaling an image for presentation on a display and claimed subject matter is not limited in this respect. A user preference may be received at block 402 from, for example, a user interface such as a remote control and/or a control panel. Such a user preference may include, for example, one of the aforementioned first, second or third options illustrated above with reference to FIGS. 3A through 3C, 4A and 4B. However, these are merely examples of a user preference and claimed subject matter is not limited in these respects. Block 404 may store the received user preference in a non-volatile memory device to be applied to image data received in the future.

At block 406, image data may be obtained from, for example, a server via a data link and communication adapter as illustrated above. In alternative embodiments, however, such image data may be received from an attached storage device such as, for example, a magnetic storage device, VCR, DVD player DVR and/or the like. However, these are merely examples of how image data may be obtained and claimed subject matter is not limited in these respects. In one particular embodiment, although claimed subject matter is not limited in this respect, the received image data may be transcoded to a predetermined format. Alternatively, process 400 may transcode the received image data to a predetermined format.

Block 408 may transform and/or map the obtained image data to a display format (e.g., SD or HDTV as illustrated above) according to the user preference stored at block 404. In one particular embodiment, although claimed subject matter is not limited in this respect, block 408 may transform image data to pixel locations in a predetermined display format. Here, block 408 may initially decode image data to provide a display signal (e.g., as described above in connection with decoder 108). Block 408 may then further process the decoded image data according to the user preference stored at block 404 to provide an image that is scaled for presentation as a viewable image on a display (e.g., as illustrated above in connection with FIGS. 3A through 3C, 4A and 4B according to a particular embodiment). Block 410 may then generate signals to a display based, at least in part, the image that is scaled for presentation on the display.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
 a memory to store image data representative of an image comprising one or more image dimensions; and
 logic to map one or more of said image dimensions to one or more image display dimensions of a display for presentation of a viewable image on said display based, at least in part, on said image data and a predetermined user preference;
 wherein said one or more image display dimensions comprise a display width and a display height, and wherein one or more image dimensions comprise an image width and an image height; and
 wherein said user preference
  comprises mapping said image width to an image width of said viewable image substantially matching said display width, and mapping said image height to an image height of said viewable image substantially matching said display width, and
 permits distortion of said image of said image data in said viewable image.

2. An apparatus comprising:
 a memory to store image data representative of an image comprising one or more image dimensions; and
 logic to map one or more of said image dimensions to one or more image display dimensions of a display for presentation of a viewable image on said display based, at least in part, on said image data and a predetermined user preference;
 wherein said one or more image display dimensions comprise a display width and a display height, and wherein one or more image dimensions comprise an image width and an image height;
 wherein said user preference comprises substantially proportionally scaling said image height dimension and said image width dimension in said viewable image to provide at least one of the following conditions:
 said image width substantially matches said display width while said image height does not exceed said display height; or
 said image height substantially matches said display height while said image width does not exceed said display width.

3. A system comprising:
 a server to transmit image data representative of an image in a network, said image having one or more image dimensions; and
 a media device to receive said image data from said network and to map one or more of said image dimensions to one or more image display dimensions of a physical display device for presentation of a viewable image on said physical display device based, at least in part, on said image data and a predetermined user preference, said predetermined user preference being selected from a range of options comprising at least one option permitting selectable modification of said image data in said viewable image; and
 a remote control device to transmit said predetermined user preference to said media device through a wireless link.

4. A system comprising:
 a server to transmit image data representative of an image in a network, said image having one or more image dimensions; and
 a media device to receive said image data from said network and to map one or more of said image dimensions to one or more image display dimensions of a physical display device for presentation of a viewable image on said physical display device based, at least in part, on said image data and a predetermined user preference, said predetermined user preference being selected from a range of options comprising at least one option permitting selectable modification of said image data in said viewable image,
 wherein said media device comprises a substantially Universal Plug and Play Audio Visual (UPnP AV) compliant MediaRenderer and wherein said server comprises a substantially UPnP AV compliant MediaServer.

5. A system comprising:
 a server to transmit image data representative of an image in a network, said image having one or more image dimensions;
 a media device to receive said image data from said network and to map one or more of said image dimensions to one or more image display dimensions of a physical display device for presentation of a viewable image on said physical display device based, at least in part, on said image data and a predetermined user preference, said predetermined user preference being selected from a range of options comprising at least one option permitting selectable modification of said image data in said viewable image; and a display to present said viewable image in response to one or more displays signals from said media device, wherein said display is capable of presenting said viewable image in response to at least one or an NTSC and/or a PAL signal from said media device.

6. A system comprising:

a server to transmit image data representative of an image in a network, said image having one or more image dimensions;

a media device to receive said image data from said network and to map one or more of said image dimensions to one or more image display dimensions of a physical display device for presentation of a viewable image on said physical display device based, at least in part, on said image data and a predetermined user preference, said predetermined user preference being selected from a range of options comprising at least one option permitting selectable modification of said image data in said viewable image; and a display to present said viewable image in response to one or more displays signals from said media device, wherein said display is capable of presenting said viewable image in response to an HDTV signals from said media device.

7. A method comprising:

executing instructions, by a processor, to:

obtain image data representative of an image comprising one or more image dimensions;

map one or more of said image dimensions onto one or more image display dimensions of a display for presentation of a viewable image on said display based, at least in part, on said image data and a predetermined user preference;

generate display signals to present said viewable image on said display;

wherein said one or more image display dimensions comprise a display width and a display height, and wherein one or more image dimensions comprise an image width and an image height;

in response to said user preference, mapping said image width to an image width of said viewable image substantially matching said display width;

mapping said image height to an image height of said viewable image substantially matching said display width; and permitting distortion of said image of said image data in said viewable image.

8. The method of claim 7, and further comprising, in response to said user preference, substantially proportionally scaling said image height dimension and said image width dimension in said viewable image to provide at least one of the following conditions:

said image width substantially matches said display width while said image height does not exceed said display height; or said image height substantially matches said display height while said image width does not exceed said display width.

9. An article comprising:

a storage medium comprising machine-readable instructions stored thereon which, if executed by a processor, direct said processor to:

obtain image data representative of an image comprising one or more image dimensions;

map one or more of said image dimensions to one or more image display dimensions of a display for presentation of a viewable image on said display based, at least in part, on said image data and a predetermined user preference;

wherein said one or more image display dimensions comprise a display width and a display height, and wherein one or more image dimensions comprise an image width and an image height; and in response to said user preference, substantially proportionally scale said image height dimension and said image width dimension in said viewable image to provide at least one of the following conditions:

said image width substantially matches said display width while said image height does not exceed said display height; or said image height substantially matches said display height while said image width does not exceed said display width.

* * * * *